Patented Aug. 9, 1932

1,870,863

UNITED STATES PATENT OFFICE

RALPH F. MEYER, OF FREEPORT, PENNSYLVANIA, ASSIGNOR TO MEYER MINERAL SEPARATION COMPANY, OF PITTSBURGH, PENNSYLVANIA, A CORPORATION OF DELAWARE

METALLURGICAL PROCESS

No Drawing.    Application filed April 15, 1931.   Serial No. 530,296.

This invention pertains to pyrometallurgical treatment of oxidized ores and particularly to improvements in chloridizing roasting thereof to facilitate extraction of metal values from the ore.

As contrasted with hydrometallurgical processes, pyrometallurgical attack of ores has not found chlorine to be an entirely practicable reagent. Chloridizing roasting of ore with salt and a plentiful supply of air has been known many years, though as a generally inefficient process applied chiefly for recovery of precious metals. It has been proposed to roast various ores, particularly those of copper and other base metals, with different chloridizing reagents, but up to the time of my invention no practical or commercially important result has followed. In this connection, authorities have recognized that detriments to acceptable chloridizing roasting exist in pronounced tendencies of metal compounds to volatilize from the ore, and of metal chlorides to reoxidize to oxides, and further in that the previously known chloridizing procedures do not efficiently attack oxidized or refractory contents of the ores.

An object of this invention is to roast oxidized ore with chloridizing salts so as practically to attack the oxidized and refractory metalliferous contents profoundly and efficiently, eliminate volatilization and reoxidation, and to accumulate metal values in the calcine in condition readily amenable to simple leaching. Other objects are to lessen the cost and amount of reagents needed, and to decrease the heat requirements and heat losses of chloridizing roasting, as compared with prior processes of this type.

A further object is to obtain a calcine in such physical condition that it filters readily when leached. Another object is to provide a calcine low in water-soluble iron and relatively high in soluble chlorides of other metals, so as to facilitate obtaining uncontaminated leaching solutions suitable for electrolytic or other simple recovery of the metals.

This invention is predicated on my discovery that these and other objects are accomplished by roasting moistened oxidized ore with ferrous chloridizing reagent at a relatively low temperature above 250° C., and causing formation and accumulation of chloridized metal values in the charge by introducing air or other oxygen-containing gas in amounts less than that theoretically needed to oxidize said ferrous reagent to ferric oxide, and not substantially exceeding that theoretically necessary for such oxidation of any excess ferrous reagent. Thus, volatilization is avoided, as well as reoxidation of chloridized metals, while oxidizing a major portion of said ferrous reagent.

As one particular embodiment of this invention, I roast moist oxidized ore containing some slight excess of ferrous chloridizing reagent, for example ferrous chloride, between about 250° and 550° C., while introducing air in an amount restricted to as low as 75 per cent of that theoretically required to convert the excess ferrous chloride to ferric oxide.

A broad meaning is given in this application to the term "ore," since the benefits of this invention extend to a large range of metalliferous materials, including concentrates, slags, and the like, as well as to ores strictly. Further, the term "oxidized ore" includes not only materials such as oxides, carbonates, sulfates, etc., but also sulfides, arsenides, mattes, speiss, etc., that have been oxidized even though incompletely; for example, roasted ores containing refractory sulfides in small amount. Preliminary oxidation of these latter materials is desirable, but it need not exceed economical limits nor be controlled particularly. In fact, an advantage of this invention resides in the chloridizing of residual refractory sulfides and the like, which frequently accompany oxidized ores.

Also, the word "air" includes oxygen-containing gases and free oxygen broadly, it being recognized that air simply is an economical source of oxygen. Ferrous chloride as such is the preferred reagent, but the term "ferrous chloridizing agent," is used to refer concisely to its equivalents as well, such as ferrous sulfate and sodium chloride.

Suitable conditions for the practice of this invention may be attained in various ways. Preferably a mixture is prepared of oxidized ore, moisture and sufficient ferrous chloride to chloridize the values. The amount of ferrous reagent preferably exceeds slightly the amount theoretically required, though two to three per cent excess usually is sufficient to assure complete chloridizing of the metal values. The presence of ferrous oxide in the charge is of especial advantage for efficiency of attack by the reagent proper, because in its presence ferrous chloride does not break down below about 250° C. Ferrous oxide here means any iron oxide in a lower state of oxidation. Active ferroso-ferric oxide or magnetic oxide is a particularly desirable form. It is produced by reducing ferric oxide above 400° C. and cooling with exclusion of moisture and air.

Although dry ore may be mixed with hydrated ferrous chloridizing agent, the preferred practice is to form ferrous chloride in and throughout the ore by providing it with ferrous oxide, moistening the mixture, and introducing chlorine to form ferrous chloride. In this embodiment particularly efficient distribution of ferrous chloride is obtained if a degree of moistening is maintained that is termed quasi-wetting.

Quasi-wetting is used herein to describe briefly that moistened condition of the ore in which free liquid is absent from the interstices of the ore and no appreciable film of liquid surrounds the individual particles. This is obtainable even though the ore has been ground to pass 100 to 200 standard mesh, (4 to 8 meshes per millimeter) as is preferable for most efficient ferrous salt formation. Quasi-wet ore is scarcely moist to the touch; considerable hand pressure is required to compact it, and it crumbles easily again after such compacting. A portion of quasi-wet ore occupies more volume than either before being thus wet or when liquid is present in excess of this amount.

In heating the prepared charge containing ferrous chloridizing agent to roasting temperature the ore appears to become dry, but loss of moisture may be more apparent than real. In fact, in commercial practice the prepared ore charges are preferably heated at about 150° C. to apparent dryness or a sandy condition, and the thus dried mixture is then stored in readiness for the chloridizing roast. On roasting, practically all of the iron becomes converted to oxide even though the air admitted to the roasting furnace be dry and in amount substantially less than theoretically needed to oxidize the ferrous reagent.

During chloridizing roasting of this charge, it is not necessary for the temperature to exceed about 550° C. as a maximum, and preferably roasting is conducted at about 350° C. In particular cases, with some metals of exceptionally refractory values, these limits may be exceeded somewhat. But in general a roasting range of about 300° C. to 400° C. suffices for the metals usually encountered, such as zinc, manganese, copper, lead, and even many refractory sulfides, for instance those of copper or nickel. Likewise, gold and silver are generally obtained in readily extractable condition by such roasting temperatures.

A particular feature of this invention resides in the amount of air used in roasting, to obtain certain of the benefits of the invention. In its practice the air introduced is limited to a maximum of approximately that theoretically needed to convert the excess ferrous chloride to ferric oxide. As a result, the metal values in the ore are obtained in condition readily amenable to simple leaching, largely as water soluble chlorides. The iron is retained, preponderantly as ferric oxide, with the water-soluble iron chloride in most cases constituting about one per cent or less of the calcine. If some air or oxygen were not used, so much undecomposed ferrous chloride would remain in the calcine as to cause much trouble, and only a partial chloridizing of the metals would result.

The following example is illustrative of the benefits of the process provided by the invention. A sulfide nickel ore was partially oxidized, and as thus prepared it had a nickel content of 3.75 per cent, copper 0.25 per cent, and cobalt 0.33 per cent, together with about 2 per cent of sulfur as refractory sulfides. After oxidation it was reduced at 600° C. with natural gas to form ferrous iron oxide (ferroso-ferric oxide) and cooled in a dry, natural gas atmosphere to 150° C. or less. The material was now a black or nearly black color. This material was reduced in size to pass about 150 standard mesh. It was then brought to quasi-wet condition and admixed with ferrous chloride in an amount corresponding to approximately 2.5 per cent more chlorine than the 5 per cent theoretically necessary in this case to chloridize the copper, cobalt and nickel. The mixture was roasted at about 325° C. for one hour.

The roast was conducted so that 0.5 per cent chlorine remained in the calcine as water-soluble iron chloride to protect the chloridized metals against reoxidation and decomposition. To convert the ferrous chloride corresponding to the remaining 2 per cent to ferric oxide theoretically would require 0.0068 pound of oxygen per pound of ore, but the roast was conducted with only 0.3 cubic feet of air or 0.0052 pound of oxygen per pound of ore. This dry air was equivalent to only eighty per cent of the oxygen theoretically necessary to convert the excess ferrous chloride to ferric oxide. In this roast, the calcine became slightly red just before it was discharged from the furnace, and on leaching with water showed a very high extraction; namely nickel 94.5 per cent, copper 100 per cent, cobalt all but a trace. The chlorine and acid gases produced by the chloride roast were absorbed in new lots of reduced ore in the quasi-wet state to form ferrous chloride.

The same ore was treated under identical conditions, except that two cubic feet of air per pound of ore were introduced. As a result only 64 per cent of the nickel was soluble in water; and the insoluble nickel oxide in the tailings had now become refractory and required strong acid to dissolve it.

By way of further example, reference is made to another ore that was treated according to this invention. This was a sulfide ore having a lead content of 7.6 per cent, copper 4.2 per cent, manganese 1 per cent, gold 1.1 ounce, and silver 5 ounces per ton, and sulfur 15 per cent, with some silica, iron, etc. This ore was roasted four hours to remove sulfides and then was partially reduced with natural gas to form some magnetic iron oxide. The ore then was made quasi-wet with about 8 per cent water and treated with sulfur dioxide and air alternately for three hours until the lead oxide was converted to lead sulfate. The ore now contained about 1.5 per cent of soluble iron as ferrous sulfate. Sodium chloride was added to about 5 per cent and chlorine was contacted with the quasi-wet ore until there was a 2.5 per cent excess of total chlorine above that needed to combine with the insoluble copper and silver. The ore was dried at 100–150° C. until all the free water was driven out. Then roasting was carried out in a muffle type furnace, a revolving kiln, at a temperature of 350° C. for one hour, while introducing 0.4 cubic feet of air per pound of ore. The calcine contained 0.25 per cent chlorine as water-soluble iron chloride. To have oxidized the 2.25 per cent excess chlorine would have required 0.0077 pounds of oxygen per pound of ore, but only 0.0073 pounds of oxygen or about 95 per cent of this amount was actually introduced in the air. On leaching the calcine, 97.8 per cent of the copper was soluble in water; practically all of the silver was extracted as chloride and 95.1 per cent of the gold was soluble in cyanide.

This same ore was treated under identical conditions, except that 2.5 cubic feet of air per pound of ore were introduced. As a result only 72 per cent of the copper was soluble in water and so much copper remained in the tailings as to prohibit their treatment with cyanide.

In general, externally heated furnaces are most suitable, involving the advantages of continuous process, agitation of the charge and readiness of control. Air for the roast preferably is introduced counter-currently to the ore when a low content of water soluble iron is sought, as for electrolytic recovery. The progress of the roasting is followed readily, for as the charge passes through the furnace the calcine gradually changes from its initial dark color until toward the end it attains noticeably the red color of ferric oxide. The assumption of this red color too far up in the furnace, and too intensive red color, indicate that too much oxygen is being admitted, and is evidence of undesired breaking down of metal value chlorides, such as those of copper or nickel chloride. This observation affords a ready practical criterion for control of the air. It is easily correlated to the desirable object of retaining approximately one per cent or less water soluble iron in the calcine. Another ready test is to determine whether any magnetic oxide remains, since conducting the roast so that some water-soluble iron remains also results in retaining some of the ferrous oxide which, as stated, preferably is present at the beginning of the roast.

An outstanding advantage of this process is that substantially all of the values are leachable, a considerable proportion being water-soluble chloride. The chlorine exerts a profound, deep attack on the ore particles, extending even to the refractory contents, and there is practically no loss of values by volatilization.

The calcine obtained is of friable, permeable, sandy character, due in part to the low temperature of the roasting and in part to the restriction of oxidation, both of which flow from this invention. When more air is used the calcine becomes much denser and less permeable. These characteristics are of particular advantage in leaching, since such calcine is readily penetrated by leaching solutions and filters readily without sliming. Extraction of the water-soluble chlorides, such as of zinc, copper or nickel, is substantially complete, and the leach solutions are substantially uncontaminated with iron, so that they may be electrolyzed directly with but little purification. Subsequently, such chlorides as of silver may be extracted from the calcine residue with special leaching agents, and silver and gold are obtainable efficiently by the usual cyanide treatment for example.

Introduction of the air, however, may be in concurrent flow with the ore, as when the absence of water-soluble iron is not so important. Whichever the flow of air, there appears to be some moisture retained in the ore even up to above 250° C., with consequent formation of hydrochloric acid. With concurrent flow of ore and air, some of this acid appears to be absorbed in the final calcine to increase the water-soluble chloride content.

According to the provisions of the patent statutes, I have explained the principle of my invention and have described what I now consider to represent its best embodiment. However, I desire to have it understood that, within the scope of the appended claims, the invention may be practiced otherwise than as specifically described.

I claim:

1. A process of chloridizing oxidized ore, comprising moistening said ore, roasting it in admixure with ferrous chloridizing reagent at chloridizing temperature above 250° C. to form a calcine and to accumulate the chloridized metal values in the calcine, while introducing air in amount substantially less than theoretically required to oxidize said ferrous reagent to ferric oxide, said reagent chloridizing the metal values and being preponderantly oxidized to ferric oxide.

2. A process of chloridizing oxidized ore, comprising providing moist oxidized ore with ferrous chloridizing reagent in slight excess over that theoretically required for chloridizing, and then roasting at chloridizing temperature above 250° C. to form a calcine and to accumulate the chloridized metal values in the calcine, while introducing air in amount less than substantially that required theoretically to oxidize said excess ferrous reagent to ferric oxide, said reagent chloridizing metal values and being preponderantly oxidized, and said calcine containing water-soluble iron to less than approximately 1½ per cent, and chlorides of metal values and ferric oxide.

3. A process of chloridizing oxidized ore, comprising providing a quasi-wet mixture of oxidized ore and ferrous oxide, introducing chlorine into said quasi-wet mixture to form ferrous chloride in slight theoretical excess and then roasting at between 250° C. to 550° C. to form a calcine and to accumulate the chloridized metal values in the calcine, while introducing air in amount less than substantially that theoretically required to oxidize said excess ferrous chloride to ferric oxide, said ferrous chloride chloridizing the metal values, and said calcine containing less than 1½ per cent water-soluble iron, and chlorides of metal values and ferric oxide.

4. A process of chloridizing oxidized ore, comprising providing a mixture of oxidized ore, moisture and slight theoretical excess of ferrous chloride, then roasting to 300° C. to 450° C. to form a calcine and to accumulate the chloridized metal values in the calcine, while inducing a flow of said ore in contact with air restricted in amount to less than substantially that theoretically necessary to oxidize said excess ferrous chloride to ferric oxide, said ferrous chloride chloridizing metal values, and said calcine containing water-soluble iron to less than approximately 1½ per cent, and chlorides of metal values and ferric oxide, and then leaching said calcine.

5. A process of chloridizing oxidized ore, comprising providing a mixture of oxidized ore, ferrous oxide, moisture and up to approximately three per cent theoretical excess ferrous chloride, and then roasting to approximately 375° C. to form a calcine and to accumulate the chloridized metal values in the calcine, while inducing a flow of said ore in contact with dry air restricted in amount to not more than that theoretically required to oxidize said excess ferrous chloride to ferric oxide, said ferrous chloride chloridizing metal values and said calcine containing water-soluble iron, and chlorides of metal values and ferric oxide.

6. A process of chloridizing oxidized ore, comprising providing a mixture of oxidized ore, moisture, ferrous oxide and ferrous chloride, then roasting at between 250° C. to 450° C. to form a calcine while accumulating the chloridized metal values in said calcine and inducing a flow of said ore in contact with air restricted in amount to produce ferric oxide and to retain water-soluble iron in the calcine thus formed.

7. A process of chloridizing oxidized ore, comprising providing a mixture of moisture, ferrous oxide, slight theoretical excess of ferrous chloride, and oxidized ore passing 100–200 standard mesh, eliminating apparent moisture at approximately 150° C., then roasting at less than 550° C. to form a calcine and to accumulate the chloridized metal values in the calcine and inducing a flow of ore in contact with air restricted in amount to not more than that theoretically required to oxidize said excess ferrous chloride to ferric oxide, said ferrous chloride chloridizing metal values and being oxidized, and said calcine containing water-soluble iron and chlorides of metal values and ferric oxide.

8. A process of chloridizing oxidized ore, comprising providing a mixture of oxidized ore, moisture and slight theoretical excess of ferrous chloride, then roasting to between 300° C. to 500° C. to form a calcine and to accumulate the chloridized metal values in the calcine, while inducing countercurrent flow of said ore in contact with air restricted in amount to less than substantially that theoretically necessary to oxidize said excess ferrous chloride to ferric oxide, said ferrous chloride chloridizing metal values, and said calcine containing water-soluble iron to less than approximately 1½ per cent, and chlorides of metal values and ferric oxide, and then leaching said calcine.

9. A process of chloridizing oxidized ore, comprising providing a mixture of oxidized ore, moisture and slight theoretical excess of ferrous chloride, then roasting to between 300° C. to 500° C. to form a calcine and to accumulate the chloridized metal values in the calcine, while inducing concurrent flow of said ore in contact with air restricted in amount to less than substantially that theoretically necessary to oxidize said excess ferrous chloride to ferric oxide, said ferrous chloride chloridizing metal values, and said calcine containing water-soluble iron, chlorides of metal values and ferric oxide, and then leaching said calcine.

In testimony whereof, I sign my name.

RALPH F. MEYER.